(12) United States Patent
Howland et al.

(10) Patent No.: US 6,819,813 B2
(45) Date of Patent: Nov. 16, 2004

(54) OPTICAL LAND GRID ARRAY INTERPOSER

(75) Inventors: Stephen R. Howland, Vestal, NY (US); John U. Knickerbocker, Wappingers Falls, NY (US); Steven P. Ostrander, Wappingers Falls, NY (US); Martin L. Schmatz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 10/242,152

(22) Filed: Sep. 11, 2002

(65) Prior Publication Data

US 2004/0047538 A1 Mar. 11, 2004

(51) Int. Cl.[7] ................................................ G02B 6/12
(52) U.S. Cl. ............................ 385/14; 385/9; 385/27; 385/39; 385/129; 385/131; 385/132; 438/25; 438/26; 438/28; 372/43
(58) Field of Search ................................ 385/9, 14, 27, 385/39, 129, 131, 132; 438/25, 26, 28; 372/43

(56) References Cited

U.S. PATENT DOCUMENTS

| | | |
|---|---|---|
| 5,200,631 A | 4/1993 | Austin et al. |
| 5,266,794 A | 11/1993 | Olbright et al. |
| 5,357,122 A | 10/1994 | Okubora et al. |
| 5,488,735 A | 1/1996 | Tanabe et al. |
| 5,500,540 A * | 3/1996 | Jewell et al. ................. 257/82 |
| 5,627,923 A | 5/1997 | Kakizaki |
| 5,631,988 A | 5/1997 | Swirhun et al. |
| 5,812,571 A | 9/1998 | Peters |
| 5,848,214 A | 12/1998 | Haas et al. |
| 6,005,262 A | 12/1999 | Cunningham et al. |
| 6,027,254 A | 2/2000 | Yamada et al. |
| 6,067,307 A | 5/2000 | Krishnamoorthy |
| 6,097,857 A * | 8/2000 | Feldman ....................... 385/14 |
| 6,112,002 A | 8/2000 | Tabuchi |
| 6,164,836 A | 12/2000 | Yamada et al. |
| 6,243,509 B1 | 6/2001 | Chen |
| 6,304,690 B1 | 10/2001 | Day |
| 6,603,915 B2 * | 8/2003 | Glebov et al. ............... 385/129 |
| 6,661,943 B2 * | 12/2003 | Li ................................ 385/18 |

FOREIGN PATENT DOCUMENTS

| | | |
|---|---|---|
| EP | 1 139 122 A2 | 10/2001 |
| WO | WO 01/31389 A1 | 5/2001 |
| WO | WO 01/43319 A1 | 6/2001 |

* cited by examiner

Primary Examiner—John R. Lee
Assistant Examiner—David A. Vanore
(74) Attorney, Agent, or Firm—James J. Cioffi

(57) ABSTRACT

An apparatus for integrating optical devices between a module and a circuit board comprising a carrier having optical waveguides, a module having optical ports on a surface of the module, the surface of the module connected to the carrier such that the optical waveguides are in communication with the optical ports; and a circuit board having optical ports on a surface of the circuit board, the surface of the circuit board connected to the carrier such that the optical waveguides are in communication with the optical ports. The apparatus may also integrate electrical ports on the surface of the module, the surface of the circuit board, and electrical connections on the carrier. The apparatus may also integrate circuit chips having optical ports for communication with the optical waveguides.

20 Claims, 3 Drawing Sheets

OPTICAL LAND GRID ARRAY INTERPOSER

BACKGROUND OF THE INVENTION

This invention relates generally to optical interfaces for data communication and, more particularly, to the integration of optical elements into existing microelectronic packaging technology. Optical data communications technology has a number of advantages over wire technology. These include bandwidth, data rate and response characteristics superior to those of conventional wire technology. Optical technology is immune to radio frequency interference (RFI) and electromagnetic interference (EMI) issues associated with wire technology.

Accordingly, the use of optical interfaces for data communications is desirable in a variety of applications such as multi-chip modules (MCMs), printed circuit board (PCB) technologies and integrated backplanes. In such systems optoelectronic devices are employed at the point of conversion from light to electronic transmission, and vice-versa. Optoelectronic devices typically comprise semiconductor devices such as light emitting diodes (LEDs), laser diodes, and Vertical Cavity Surface Emitting Laser (VCSEL) array chips, which exist today in gallium arsenide technology and provide a wide variety of applications including optical interconnections of integrated circuits.

An important aspect of optical communication technology is the optical coupling used to communicate optical signals between optoelectronic components, for example, between different circuit boards or between different chips on a circuit board. Typical systems for interconnecting a plurality of optoelectronic devices involve placing a connector on the edge of the circuit board and inserting a pack or bundle into a shelf so that the connector mates with pins on a backplane. Problems associated with this technology include optical fibers left to hang loose between packs and creating a "rat's nest" of fibers. Another problem is that optoelectronic alignment is an expensive hand tuning operation. These problems have limited the applicability of optoelectronic technology.

There is therefore a need for packaging solutions that integrate current packaging technology with new optical communications capabilities. It is therefore an object of this invention to provide a structure for integrating optical devices between a module and a circuit board by a means that utilizes current packaging and semiconductor technology.

These and other purposes of the present invention will become more apparent after referring to the following description considered in conjunction with the accompanying drawings.

BRIEF SUMMARY OF THE INVENTION

The purposes and advantages of the present invention have been achieved by providing, according to a first aspect of the invention an apparatus for integrating optical devices between a module and a circuit board comprising:

a carrier having a plurality of optical waveguides;
a module having a plurality of first optical ports on a bottom surface of the module, the bottom surface of the module connected to the carrier such that the optical waveguides are in communication with the first optical ports; and a board having a plurality of second optical ports on a top surface of the board, the top surface of the board connected to the carrier such that the optical waveguides are in communication with the second optical ports.

The carrier may be a plastic, laminate or a ceramic carrier. The carrier may also have at least one level of metal interconnect capability. In one embodiment the carrier is an interlocking carrier assembly comprised of a first carrier having a plurality of optical waveguides connected to a second carrier having a plurality of electrical connections. The first and second optical ports on the module or board are discrete optical devices such as vertical cavity surface emitting lasers or the end of a corresponding waveguide or optical fiber.

The apparatus may further comprise a plurality of first electrical ports on the bottom surface of the module;
a plurality of second electrical ports on the top surface of the board;
a plurality of electrical connections on the carrier wherein the plurality of first and second electrical ports are in electrical contact with the plurality of electrical connections. The plurality of optical waveguides and the plurality of electrical connections may be arrayed in a variety of patterns including an interstitial pattern or arrayed in a perimeter pattern.

According to another aspect of the invention, there is provided an apparatus for integrating optical devices between a module and a circuit board comprising:

a carrier having a first plurality of optical waveguides and a second plurality of optical waveguides;
a module having a plurality of first optical ports on a bottom surface of the module and a plurality of clearance holes, the bottom surface of the module connected to the carrier such that the first plurality of optical waveguides are in communication with the first optical ports and the second plurality of optical waveguides pass through the plurality of clearance holes;
a board having a plurality of second optical ports on a top surface of the board, the top surface of the board connected to the carrier such that the first plurality of optical waveguides and the second plurality of optical waveguides are in communication with the second optical ports, and
at least one integrated circuit chip having at least one third optical port, the chip attached to a top surface of the module such that the third optical port is in communication with the second plurality of optical waveguides.

The apparatus may further comprise:
a plurality of first electrical ports on the bottom surface of the module;
a plurality of second electrical ports on the top surface of the board;
a plurality of electrical connections on the carrier wherein the plurality of first and second electrical ports are in electrical contact with the plurality of electrical connections.

According to another aspect of the invention there is provided an apparatus for integrating optical devices between a module and a circuit board comprising:

a carrier having a plurality of optical waveguides;
a module having a plurality of first optical ports on a bottom surface of the module, the bottom surface of the module connected to the carrier such that the plurality of optical waveguides are in communication with the first optical ports;
a board having a plurality of second optical ports on a top surface of the board, the top surface of the board connected to the carrier such that the plurality of optical waveguides are in communication with the second optical ports, and at least one integrated circuit chip having at least one third optical port, the chip attached to the bottom surface of the module, preferably by wirebond, such that the third optical port is in communication with the plurality of optical waveguides.

The apparatus may further comprise:

a plurality of first electrical ports on the bottom surface of the module;

a plurality of second electrical ports on the top surface of the board;

a plurality of electrical connections on the carrier wherein the plurality of first and second electrical ports are in electrical contact with the plurality of electrical connections.

BRIEF DESCRIPTION OF THE DRAWINGS

The features of the invention believed to be novel and the elements characteristic of the invention are set forth with particularity in the appended claims. The Figures are for illustration purpose only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

The purposes of the present invention have been achieved by providing an apparatus for integrating optical devices between a module and a circuit board by a means that makes optimum use of existing packaging and semiconductor technology.

More particularly, an apparatus is disclosed that integrates optical devices between a module and a circuit board comprising a carrier, which may have at least one level of metal interconnect capability, and optical waveguide means for transporting optical signals. The carrier is integrated in a land grid array (LGA) structure with waveguides that are bendable, deformable and compressible to compensate for thermal mismatch, nominal misalignment and vertical surface differences (non-planarity) between the chip, module and board so as to optimize optical coupling.

Figure 1:
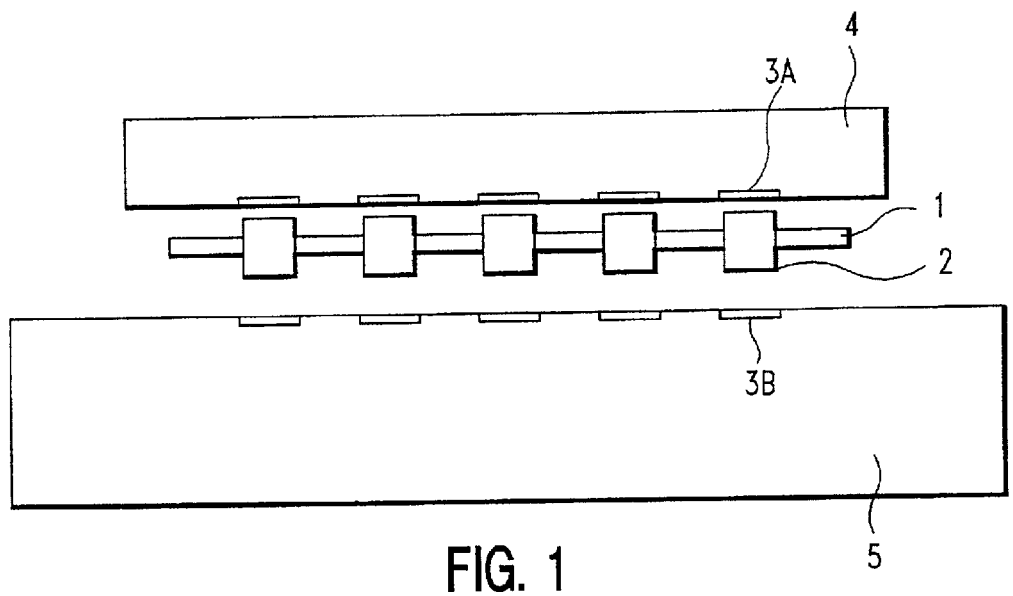
FIG. 1 is a schematic cross section view of an optical land grid array apparatus according to a first embodiment of the present invention.

Referring now to FIG. 1 there is shown an optical LGA according to a first embodiment of the present invention. A carrier 1 provides a location and position for a plurality of optical waveguides 2 for coupling optical signals from an optical port 3A on a module 4 to an optical port 3B on a circuit board 5. The carrier 1 is made from any suitably rigid material, and is preferably a laminate, plastic or ceramic carrier. The carrier 1 may also have at least one level of metal interconnect capability (not shown) for the electrical connection of the module and board in addition to the optical waveguides for transporting optical signals.

The optical waveguides 2 may be any optically transparent material known in the art for the direct coupling of optical signals from the module 4 to the circuit board 5. Preferably the optical material used is compressible and bendable or deformable to allow exact alignment between the optical ports 3A on the module 4 and the optical ports 3B on the circuit board 5, when compressed between the module 4 and board 5. Examples of a suitable optical material would be optical plastics such as polycarbonate and silicone materials.

This compression and deformation of the optical waveguides 2 is for the purpose of accommodating positional mis-registration in the x-y (horizontal) plane as well as for z (vertical) direction variation due to the topography of the mating surfaces on the circuit board 5 and module 4 and length variation of the optical waveguides 2. This compression is also to allow for direct contact of the waveguides 2 with the optical port devices for minimization of optical coupling losses. The waveguides 2 are secured to the carrier 1 in any manner suitable to the carrier material. For example, if the carrier 1 is a ceramic material the waveguides 2 may be secured to the carrier by an interference or press fit in holes in the carrier 1. If a plastic carrier is used the waveguides may be secured using an over-mold process. Alternatively, the waveguides 2 may be secured and held in holes in the carrier using an adhesive (not shown). In a preferred embodiment the optical ports (3A, 3B) on the module 4 or circuit board 5 are discrete optical devices such as a vertical cavity surface emitting laser (VCSEL) or the end of a corresponding waveguide or optical fiber.

Figure 2A:
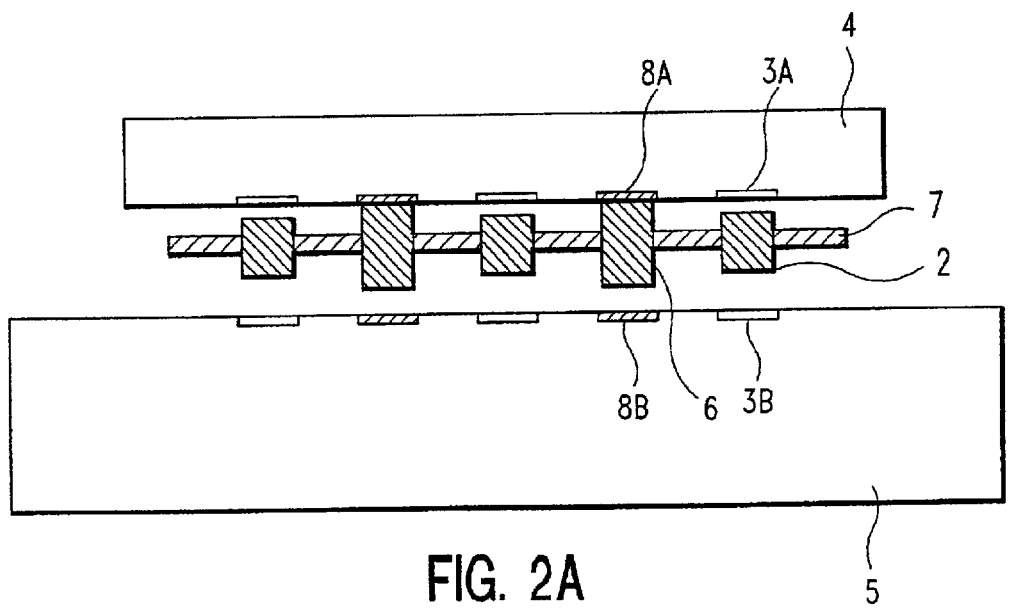
FIG. 2A is a schematic cross section view of an optical land grid array apparatus further comprising electrical connections.

Referring now to FIG. 2A there is shown an optical LGA according to another embodiment of the present invention further comprising an electrical connection path between the module 4 and the circuit board 5. Electrical connections 6 are secured to the carrier 7. The electrical connections 6 may be any compliant conductive member such as "fuzz button" connectors well known in the art. The electrical connections 6 may be connected to the carrier 7 with a variety of methods such as a press fit, adhesive or molded connection as discussed above with respect to the waveguides 2.

In this embodiment both the electrical connections 6 and optical waveguides 2 are held in a carrier 7 so as to provide an integrated assembly for the connection of optical ports 3A and electrical ports 8A from the module 4 to optical ports 3B and electrical ports 8B on the circuit board 5. The electrical ports 8A, 8B may be any conventional electrical connections or pads found on electronic modules and circuit boards. For example, for a ceramic module the electrical ports 8A may be the surface of vias filled with conductive paste or bottom surface metal (BSM) pads, typically circular, consisting of conductive paste and usually plated with a thin layer of gold.

Figure 2B:
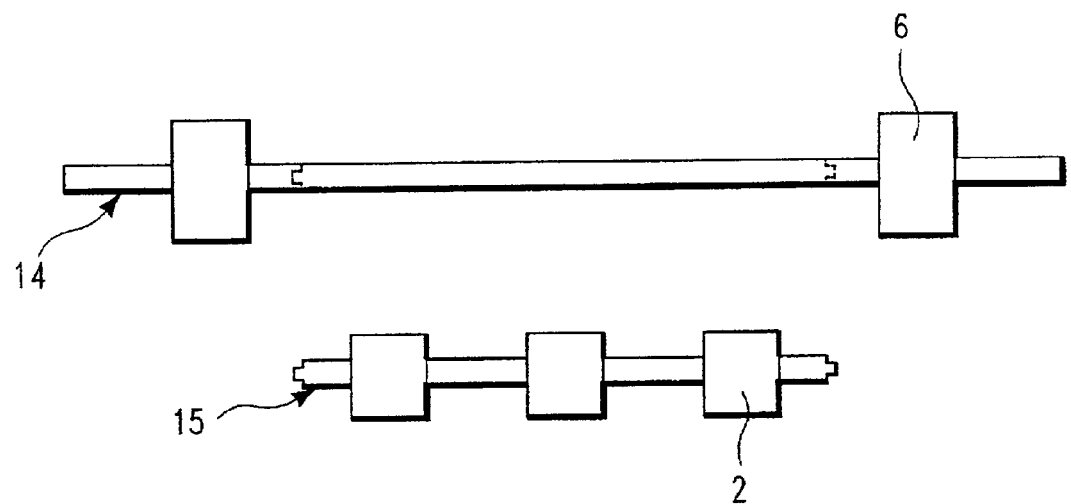
FIG. 2B is a schematic cross section view of separate components of an interlocking carrier.
Figure 2C:
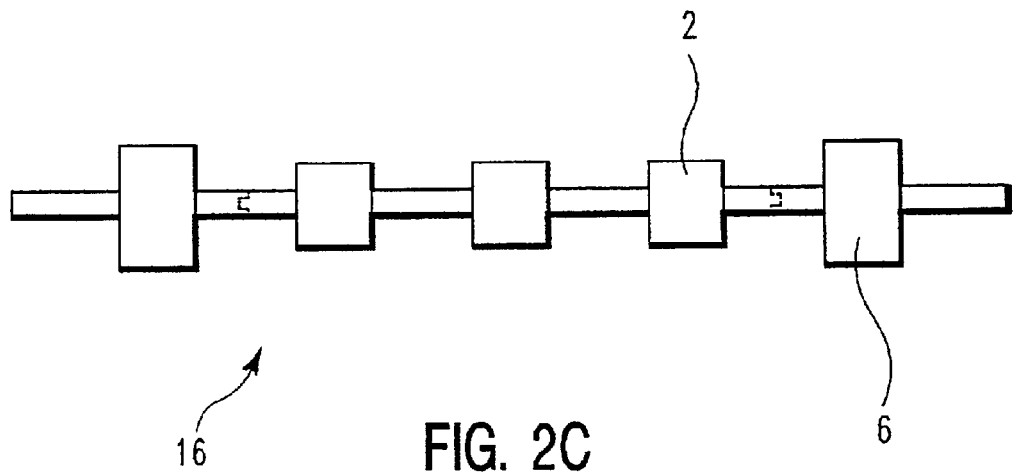
FIG. 2C is a schematic cross section view of an interlocking carrier assembly.

In this embodiment the carrier 7 may be a single piece structure, as shown in FIG. 2A, or it may be an interlocking carrier. An interlocking carrier would be an assembly consisting of two pieces. One containing the waveguides 2 and one containing the electrical connections 6. An example is illustrated in FIG. 2B. The first piece 14 would have the electrical connections 6 arrayed on the perimeter and the second piece 15 would have the optical waveguides 2 arrayed in the center. As shown in FIG. 2C, when the two pieces are connected a single carrier assembly 16 would be formed containing waveguides 2 in the center and a perimeter array of electrical connections 6.

The plurality of optical waveguides 2 and electrical connections 6 are arranged on the carrier 7 in a defined pattern to correspond with the respective locations of the optical ports 3A,3B and electrical ports 8A,8B on the module 4 and circuit board 5. This pattern includes, but is not limited to, interstitial, perimeter, centralized, and arrayed patterns.

Figure 3:
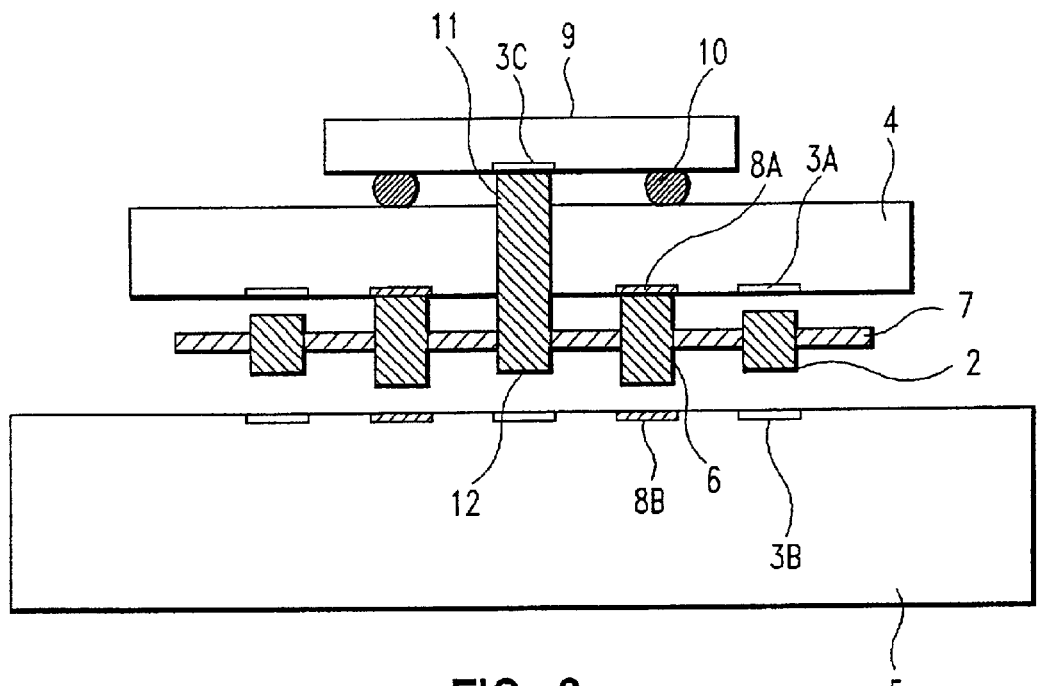
FIG. 3 is a schematic cross section view of an optical land grid array apparatus according to another embodiment of the present invention.

Referring now to FIG. 3 there is shown an optical LGA according to another embodiment of the present invention comprising an optical LGA for providing an electrical connection path between the module 4 and the circuit board 5 where optical signals are transmitted directly from the chip 9 to the circuit board 5. The module 4 has a chip 9 with optical ports or devices 3C. The chip 9 is connected to the module 4 using a flip-chip controlled collapse chip connection (C4) 10 attachment. The module 4 has holes or openings 11 therein to allow the optical ports 3C on the chip 9 to be directly coupled to the optical ports 3B on the circuit board 5 using a plurality of optical waveguides 12 passing through the openings.

The waveguides 12 are similar to the waveguides 2 previously discussed. A difference is that waveguides 12 would be longer or have a different geometry such that one end of the waveguide 12 can be in contact or close physical proximity to the optical port 3C on chip 9, and the other end of the waveguide 12 can be in contact or close physical proximity to the optical port 3B on the circuit board 5.

Figure 4:
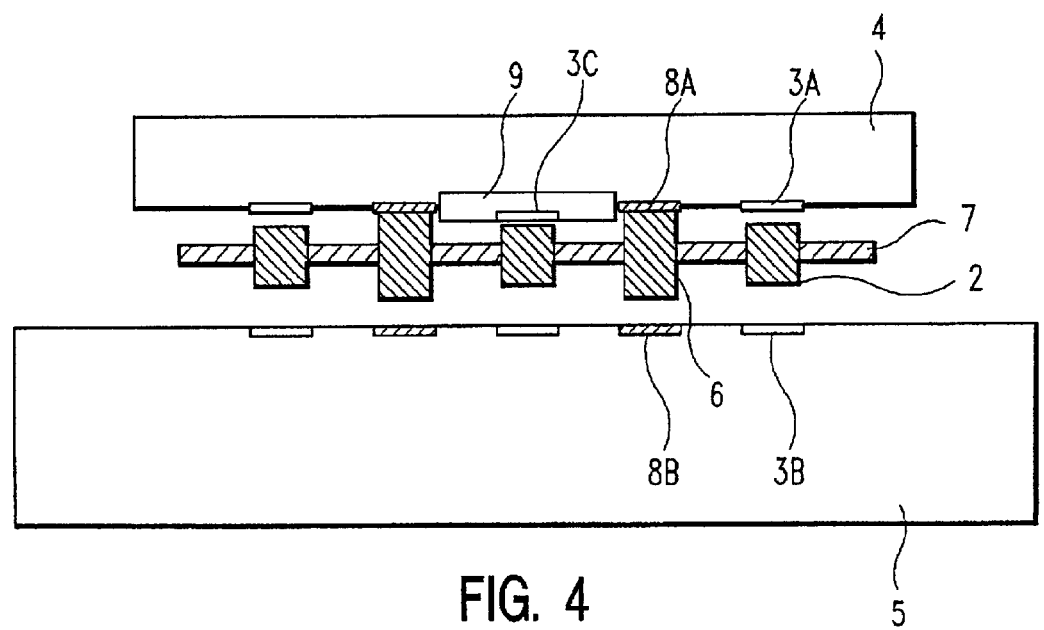
FIG. 4 is a schematic cross section view of an optical land grid array apparatus according to another embodiment of the present invention.

Referring now to FIG. 4 there is shown an optical LGA according to another embodiment of the present invention comprising an optical LGA for providing an electrical connection path between the module 4 and the circuit board 5. A module 4 has a chip 9 with optical ports or devices 3C. The chip 9 is located on the bottom of the module 4, as in a cavity down package, and connected electrically via wirebonds to pads (not shown) on the module 4. Optical ports or devices 3C located on the top of the chip 9 allow direct coupling to the circuit board 5.

In all the discussed embodiments the module 4, carrier 1,7 and circuit board 5 are held together by mechanical means well known in the art, such as by top and bottom side platens with screw, bolt or cam type clamping connections, thereby providing support, compression, and alignment to the members. This invention provides several advantages over the prior art. The novel structure provides a separable interconnect between the chip 9 or module 4 and circuit board 5 that is in a separate structure and that is integrated in an LGA structure. It provides optical waveguides 2 in an array that are bendable, deformable, and compressible to compensate for thermal mismatch, nominal misalignment, and Z axis surface differences between chip/module/board to maximize coupling between transmitters and receivers It also provides for optical waveguides 2 which pass through holes 11 in the module 4 for direct coupling of the chip 9 to the circuit board 5. The compressible and bendable or deformable waveguides 2 allow exact alignment between optical ports 3A,3B on a module 4 and a circuit board 5. The interposer structure 1,7 contains a plurality of optical waveguides 2 for coupling optical signals from an optical port 3A on a module or chip 4 to an optical port 3B on a circuit board 5.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

What is claimed is:

1. An apparatus for integrating optical devices between a module and a circuit board comprising:
   a carrier having a plurality of optical waveguides;
   a module having a plurality of first optical ports on a surface of said module, said surface of said module connected to said carrier such that said optical waveguides are in communication with said first optical ports; and
   a circuit board having a plurality of second optical ports on a surface of said circuit board, said surface of said circuit board connected to said carrier such that said optical waveguides are in communication with said second optical ports.

2. The apparatus of claim 1 wherein said carrier is a ceramic carrier.

3. The apparatus of claim 1 wherein said carrier is a plastic carrier.

4. The apparatus of claim 1 wherein said carrier has at least one level of metal interconnect capability.

5. The apparatus of claim 1 wherein said first and second optical ports are vertical cavity surface emitting lasers.

6. The apparatus of claim 1 wherein said first and second optical ports are optical fibers.

7. The apparatus of claim 1 wherein said plurality of optical waveguides are comprised of a material selected from the group consisting of plastic, polycarbonate and silicone.

8. The apparatus of claim 1 further comprising:
   a plurality of first electrical ports on said surface of said module;
   a plurality of second electrical ports on said surface of said circuit board;
   a plurality of electrical connections on said carrier wherein said plurality of first and second electrical ports are in electrical contact with said plurality of electrical connections.

9. The apparatus of claim 8 wherein said plurality of optical waveguides and said plurality of electrical connections are arrayed in an interstitial pattern.

10. The apparatus of claim 8 wherein said plurality of optical waveguides and said plurality of electrical connections are arrayed in a perimeter pattern.

11. The apparatus of claim 8 wherein said carrier is an interlocking carrier assembly comprised of a first carrier having a plurality of optical waveguides connected to a second carrier having a plurality of electrical connections.

12. The apparatus of claim 8 wherein said plurality of electrical connections are "fuzz button" connections.

13. An apparatus for integrating optical devices between a module and a circuit board comprising:
   a carrier having a first plurality of optical waveguides and a second plurality of optical waveguides;
   a module having a plurality of first optical ports on a surface of said module and a plurality of clearance holes, said surface of said module connected to said carrier such that said first plurality of optical waveguides are in communication with said first optical ports and said second plurality of optical waveguides pass through said plurality of clearance holes;
   a circuit board having a plurality of second optical ports on a surface of said circuit board, said surface of said circuit board connected to said carrier such that said first plurality of optical waveguides and said second plurality of optical waveguides are in communication with said second optical ports, and at least one integrated circuit chip having at least one third optical port, said at least one chip attached to said module such that said at least one third optical port is in communication with said second plurality of optical waveguides.

14. The apparatus of claim 13 wherein said at least one integrated circuit chip is attached to said module by a controlled collapse chip connection (C4) attachment.

15. The apparatus of claim 13 further comprising:
a plurality of first electrical ports on said surface of said module;
a plurality of second electrical ports on said surface of said circuit board;
a plurality of electrical connections on said carrier wherein said plurality of first and second electrical ports are in electrical contact with said plurality of electrical connections.

16. The apparatus of claim 15 wherein said carrier is an interlocking carrier assembly comprised of a first carrier having a first plurality of optical waveguides and a second plurality of optical waveguides connected to a second carrier having a plurality of electrical connections.

17. An apparatus for integrating optical devices between a module and a circuit board comprising:
a carrier having a plurality of optical waveguides;
a module having a plurality of first optical ports on a surface of said module, said surface of said module connected to said carrier such that said plurality of optical waveguides are in communication with said first optical ports;

a circuit board having a plurality of second optical ports on a surface of said board, said surface of said circuit board connected to said carrier such that said plurality of optical waveguides are in communication with said second optical ports, and at least one integrated circuit chip having at least one third optical port, said at least one chip attached to said surface of said module such that said at least one third optical port is in communication with said plurality of optical waveguides.

18. The apparatus of claim 17 wherein said at least one integrated circuit chip is attached to said surface of said module by wirebonds.

19. The apparatus of claim 17 further comprising:

a plurality of first electrical ports on said surface of said module;

a plurality of second electrical ports on said surface of said circuit board;

a plurality of electrical connections on said carrier wherein said plurality of first and second electrical ports are in electrical contact with said plurality of electrical connections.

20. The apparatus of claim 19 wherein said carrier is an interlocking carrier assembly comprised of a first carrier having a plurality of optical waveguides connected to a second carrier having a plurality of electrical connections.

* * * * *